United States Patent Office 2,859,234
Patented Nov. 4, 1958

2,859,234

CHEMICAL COMPOUNDS AND THE PRODUCTION THEREOF

Arthur G. Clem, Des Plaines, Ill., assignor to American Colloid Company, Chicago, Ill., a corporation of South Dakota No Drawing. Application December 7, 1956
Serial No. 626,826

9 Claims. (Cl. 260—448)

This invention relates to cation-modified, organophilic clays and to the production thereof. More particularly it relates to cation-modified bentonite complexes which swell in both polar and non-polar organic liquids, thereby forming stable gels.

This application is a continuation-in-part of my copending application Serial No. 376,518, filed August 25, 1953, now abandoned.

Certain colloidal clays, particularly bentonites, swell in water to many times their dry volume, forming thereby stable gels. Such gels are useful in forming colloidal dispersions in aqueous media, but are unsuitable for use in organic liquids. Complexes of bentonite and similar cation-exchanging silicate minerals have been converted from the hydrophilic to the organophilic form by reaction with organic ammonium salts containing at least 10 carbon atoms in a chain. See, for instance, Hauser Patent No. 2,531,427. Some of these substances are known to swell in organic solvents of the polar type and others swell in non-polar solvents, but none of them swell substantially in both polar and non-polar solvents. Organic ammonium salts containing less than 10 carbon atoms in a chain are virtually useless in forming modified clays of the foregoing type which swell adequately in organic solvents. Thus octylamine in combination with bentonite forms a product which swells only three or four-fold when dispersed in a large excess of nitrobenzene.

I have discovered a group of valuable cation-modified, organophilic clays wherein the exchangeable inorganic cation of the clay is replaced by two or more stoichiometric equivalents of an organic ammonium ion of the formula

wherein R is an organic radical, preferably a hydrocarbon radical, containing at least 5 and not more than 9 carbon atoms, and the remaining substituents, X, Y, Z, represent hydrogen atoms or organic radicals, preferably hydrocarbon radicals, containing not more than 9 carbon atoms and wherein the stoichiometric excess of the organic ammonium ion over the exchanged inorganic cation is bound to and neutralized by an organic anion containing 10 to 30 carbon atoms. Preferred are ammonium ions of the foregoing type in which the organic radical or radicals contain 7 to 9 carbon atoms. The organic anion can be a fatty acid anion or it can be derived from a synthetic anionic detergent of the sulfonic acid type.

The cation-modified clays of this invention have several advantages over other modified clays. They swell substantially in both polar and non-polar organic liquids, as well as intermediate solvents and mixtures of the liquids, whereas other modified clays do not. They exhibit rust-inhibiting properties and a resistance to oxidation, making them valuable in greases and other preparations which come in contact with metals, while amine-modified clays formerly known lack such properties.

An object of this invention is to provide organic clay complexes which will swell 10 or more times in organic liquids to form stable gels. Another object is to provide cation-modified organophilic complexes containing bentonite and low molecular weight organic amines or ammonium salts having not more than 9 carbon atoms per organic radical. A further object is to make available cation-modified organophilic bentonite complexes which will swell and form stable gels in both polar and non-polar liquids, such as nitrobenzene and toluene, respectively, as well as in solvents of intermediate polarity and in mixtures of polar and non-polar liquids.

The cation-modified organophilic clays of this invention are useful in the production of thickened or bodied organic materials. As noted above they can be used in non-polar liquids, such as aliphatic, alicyclic and aromatic hydrocarbons, mineral oils, paraffins and aliphatic-aromatic hydrocarbons, and in polar liquids, such as alcohols, esters, ketones, nitroparaffins, and nitrated aromatic hydrocarbons, as well as in solvents of intermediate polarity, such as halogenated paraffins, halogenated aromatic hydrocarbons, vegetable oils, animal oils and fats. The modified clays described herein are of value in bodying paints, reinforcing and hardening waxes, thickening wax polishes, adjusting the consistency of printing inks, and in the manufacture of paint removers, low-solid adhesives, gelled fuels, and greases. By reason of their rust-inhibiting action they are of especial value in the formulation of bodied lubricants.

The clays which are operative in this invention are those exhibiting substantial base-exchange properties, and particularly those having comparatively high base-exchange properties and containing cations capable of more or less easy replacement. The clays particularly contemplated by this invention include the montmorillonites, viz., sodium, potassium, lithium, calcium and other bentonites, such as Wyoming bentonite, magnesium bentonite (hectorite), saponite, nontronite, attapulgite, illite, zeolites, and fuller's earths, particularly those of the Georgia-Florida type. These clays, characterized by an unbalanced atomic structure or unbalanced crystal lattice, are believed to have negative charges which are normally neutralized by inorganic cations. As found in nature they exist as salts of the weak clay-acid with bases of the alkali or alkaline-earth metal hydroxides.

The base-exchange capacities of the various clays recited above run from about 15 to 125, based upon milliequivalents of exchangeable base per 100 grams of clay. The montmorillonites have comparatively high base-exchange capacity, e. g., 60–100. Attapulgite and illite have substantial base-exchange capacity in the range of 25–35 and 15–40, respectively. Generally the clays of higher base-exchange capacity, i. e., of at least 25, are particularly useful in this invention where high exchange of an organic ammonium ion for the inorganic cation of the clay is desired. Of especial interest are clays having base-exchange capacities in the range of 60–100, for these form complexes with high organic content which swell markedly in both polar and nonpolar organic liquids.

The organic amines and ammonium salts which are used in this invention comprise the aliphatic and alicyclic amines and acid-addition and quaternary ammonium salts thereof, wherein each organic radical contains not more than 9 carbon atoms. The amines can be primary, secondary or tertiary and can be used in the form of free bases or as acid-addition or quaternary salts. The salts are preferred over the free bases because of their greater water-solubility. Representative of the amines and ammonium salts which are suitable are the following: octylamine, nonylamine, 2-ethylhexylamine, hexylamine, dimethylhexylamine, diethylheptylamine, dibutylamylamine, dimethyloctylamine, methyloctylamine, ethylhexylamine, dioctylamine, diamylcyclohexylamine, dicyclohexylamine, benzyldihexylamine, phenethyloctylamine and the like, as well as water-soluble acid addition salts with acids such as hydrochloric, sulfuric, acetic, citric, tartaric, hydrobromic, phosphoric. Quaternary ammonium salts are also operative, including trimethylhexylammonium chloride, triethyloctylammonium bromide, dimethyldicyclohexylammonium chloride and benzyldimethylhexylammonium chloride. Such salts are obtained by reacting tertiary amines of the type disclosed above with aliphatic or araliphatic esters of hydrohalic, sulfuric or organic sulfonic acids. Among such esters are methyl chloride, ethyl bromide, propyl iodide, dimethyl sulfate, methyl benzenesulfonate, benzyl chloride, phenethyl bromide and the like.

All of the nitrogen compounds disclosed above, i. e., primary, secondary and tertiary amines and acid addition salts and quaternary ammonium salts thereof, provide organic cations when dissolved or dispersed in water. For instance, a primary amine having the general formula $R-NH_2$ (wherein R represents an organic radical of 5 to 9 carbon atoms) partially reacts with water as follows:

$$R-NH_2 + H^+ + OH^- \rightarrow R-NH_3^+ + OH^-$$

Similarly a primary amine hydrochloride dissociates in water to provide ammonium ions as follows:

$$R-NH_2 \cdot HCl \rightarrow R-NH_3^+ + Cl^-$$

Secondary and tertiary amine and acid-addition salts thereof react in the same manner in water. Quaternary ammonium salts are highly dissociated in water and provide relatively large concentrations of ammonium ions. The organic ammonium ions derived from the amines and salts disclosed above react in water to displace the inorganic cations of the clays.

The stoichiometric excess of ammonium ion over that required to replace the inorganic cation is combined with or neutralized by an organic anion containing 10 to 30 carbon atoms. This forms a water-insoluble compound which coprecipitates with the clay-ammonium complex and the resultant precipitate, when separated, washed, and dried, is the desired product.

The organic anion is provided by soaps such as those from coconut fatty acids, tallow fatty acids, cottonseed oil fatty acids and the like, as well as by synthetic anionic detergents. More specifically sodium, potassium and lithium salts of capric, undecylic, lauric, myristic, palmitic, margaric stearic, oleic, linoleic, linolenic, arachidic, behenic, lignoceric, cerotic, montanic, melissic and ricinoleic acids are suitable. Likewise sodium lauryl sulfate, sodium cetyl sulfate, and sodium stearyl sulfate are operative. Other sources of organic anions include dialkyl esters of sodium sulfosuccinic acid wherein the alkyl groups contain 5 to 10 carbon atoms, sodium alkylnaphthalenesulfonates in which the alkyl radicals contain 8 to 12 carbon atoms, sodium salts of sulfonated petroleum hydrocarbons containing 10 to 20 carbon atoms, sodium salts of sulfonated lower alkyl oleates, sodium polyalkoxyaryl-sulfonates containing 10 to 20 carbon atoms, sodium alkylbenzenesulfonates in which the alkyl substituent contains 10 to 14 carbon atoms $(alkyl)_5Na_5P_6O_{20}$ wherein the alkyl radical is octyl or capryl, and $$acyl-O-C_2H_4-SO_3Na$$

in which the acyl radical is derived from a fatty acid of 10 to 18 carbon atoms. All of these anionic substances on solution in water dissociate into alkali metal ions and organic anions of an organophilic nature.

In practice the cation-modified organophilic clays are produced as follows. A swelling clay, such as Wyoming bentonite, is dispersed in a large volume of water and to the dispersion is added 1.0 to 2.5 stoichiometric equivalents (calculated on the base-exchange capacity of the clay) of soap or anionic detergent in aqueous solution. No reaction occurs, since both materials are anionic in nature. Then 2.0 to 3.5 equivalents of an amine salt or ammonium salt (e. g., octylamine acetate) are added. The quantity of ammonium compound is calculated to be stoichiometrically equivalent to the amount of exchangeable inorganic cation in the clay plus the amount of anionic material added thereto. An immediate and complete reaction takes place with the co-precipitation of the cation-modified clay. This product is removed from the liquid, washed and dried.

Alternatively a swelling clay is dispersed in a large volume of water and to it is added at least that quantity of a salt of the organic amine with a fatty acid or with the acid form of a synthetic anionic detergent which is stoichiometrically equivalent to the amount of exchangeable cation in the clay. No reaction occurs until one stoichiometric equivalent (calculated on the base-exchange capacity of the clay) of the organic amine or amine salt is added, whereupon a co-precipitation of cation-modified clay occurs.

My invention is disclosed in more detail by the following examples, which are provided for the purpose of illustration and are not to be construed as limiting the invention in spirit or in scope. Relative amounts of materials are given in parts by weight unless otherwise noted.

*Example 1*

To 50 parts of swelling sodium bentonite in 1500 parts of water is added one stoichiometric equivalent of sodium alkylnaphthalenesulfonate wherein the alkyl radical contains an average of 10 carbon atoms. There is no reaction, since both substances are anionic in nature. To the suspension are added 2 stoichiometric equivalents of octylamine acetate (octylammonium acetate). An immediate and complete reaction ensues, with the co-precipitation of cation-modified organophilic octylammonium bentonite alkylnaphthalenesulfonate. This is separated, washed well with water, dried and ground to fine powder. When 2 grams of this product are suspended in 100 cubic centimeters of nitrobenzene it swells to a large volume of greater than 50 cc.

*Example 2*

To 50 parts of swelling sodium bentonite in 1500 parts of water is added the product obtained by reacting one stoichiometric equivalent of di(2-ethylhexyl)amine with one stoichiometric equivalent of lauric acid. No reaction takes place. Then one stoichiometric equivalent of di(2-ethylhexyl)amine acetate is added, and a co-precipitate of cation-modified organophilic di(2-ethylhexyl)ammonium bentonite laurate is immediately formed. This product is removed by filtration, washed, dried and ground. Two grams of this product in an excess of nitrobenzene swell to a volume greater than 50 cubic centimeters.

*Example 3*

A cation-modified organophilic bentonite is made as in Example 1 using two stoichiometric equivalents of octylamine acetate and one stoichiometric equivalent of sodium palmitate. The product, octylammonium bentonite palmitate, thus obtained swells in an excess of nitrobenzene to more than 25 times its dry volume.

*Example 4*

To 50 parts of swelling sodium bentonite in 1500 parts of water is added two stoichoimetric equivalents of octylamine acetate. Then one stoichiometric equivalent of sodium palmitate is added, with the immediate co-precipitation of cation-modified octylammonium bentonite palmitate. The product is removed by filtration, washed and dried. Two grams of this material in an excess of toluene swell to 16 cubic centimeters.

*Example 5*

To 50 parts of swelling bentonite in 1500 parts of water is added the three stoichoiometric equivalents of octylamine acetate. To the resulting suspension is added two stoichiometric equivalents of sodium laurate. There is an immediate and complete reaction, with the formation of a co-precipitate of cation-modified octylammonium bentonite dilaurate. This material is separated, washed and dried. When 2 grams of this material are suspended in an excess of toluene it swells to a volume greater than 44 cubic centimeters.

Example 6

100 parts of bentonite are suspended in 3000 parts of water and the gritty material that settles out on standing is removed. Three stoichiometric equivalents of 2-ethylhexylamine hydrochloride are added. Then two stoichiometric equivalents of sodium salts of tallow fatty acids are added to co-precipitate the suspension. The co-precipitate of cation-modified bentonite filters readily and is washed with water to remove all excess salts. The damp sludge of 2-ethylhexylammonium bentonite tallowate thus produced is mixed thoroughly in a pony mixer or ribbon type mixer. It is then dried and ground. This procedure eliminates the difficulty of filtering the highly organic bentonite which is somewhat soapy in consistency due to its organic content of over 40%. This material when suspended in a large volume of toluene swells to over 20 times its dry volume.

Example 7

To 50 parts of calcium bentonite suspended in 1500 parts of water is added 2.5 stoichiometric equivalents of nonylamine acetate. The suspension is thoroughly mixed and agitated thoroughly with 1.5 stoichiometric equivalents of sodium lauryl sulfate. Co-precipitation of nonylammonium bentonite lauryl sulfate occurs immediately. The product is separated, dried and ground to a coarse powder. When 2 grams of this cation-modified bentonite are mixed with an excess of toluene it swells to a volume of about 26 cc.

Example 8

40 parts of Wyoming bentonite are suspended in 1000 parts of water and the dispersion is allowed to stand for 2 hours to settle out impurities. To the decanted suspension is added a solution of 2 stoichiometric equivalents of amylamine hydrochloride. The resulting mixture is agitated for 30 minutes and then treated with a solution of one stoichiometric equivalent of potassium stearate. The flocculent precipitate of cation-modified amylammonium bentonite stearate is collected on a filter, washed thoroughly with water, dried and ground to a coarse powder. This material in an excess of toluene will swell to a volume greater than 20 times its dry volume.

Example 9

To 50 parts of sodium bentonite dispersed thoroughly in 1500 parts of water is added one stoichiometric equivalent of diamylammonium stearate. No reaction occurs; the two products form a stable emulsion. Upon addition of one stoichiometric equivalent of diamylammonium acetate coagulation takes place and a flocculent co-precipitate forms. The product, diamylammonium bentonite stearate, is collected on a filter, washed, dried and ground to a powder. This product in an excess of nitrobenzene swells such that 2 grams occupies a volume in excess of 60 cc. In an excess of toluene, 2 grams of this product swell to a volume of greater than 55 cc.

I claim:

1. A cation-modified organophilic clay, originally exhibiting a base-exchange capacity of at least 25, in which the exchangeable inorganic cation has been exchanged for at least 2 stoichiometric equivalents of an organic ammonium ion wherein the organic radicals are hydrocarbon radicals which contain not more than 9 carbon atoms and at least one such organic radical contains at least 5 carbon atoms, the excess of ammonium ion over the amount of exchangeable inorganic cation being neutralized by the stoichiometric equivalent of an organic anion wherein the organic radical is a hydrocarbon radical containing at least 10 and not more than 30 carbon atoms, said cation-modified clay having the property of swelling in nonpolar organic liquids to at least 10 times its dry volume, thereby forming a stable gel.

2. A cation-modified organophilic clay, originally exhibiting a base-exchange capacity of at least 25, in which the exchangeable inorganic cation has been exchanged for at least 2 stoichiometric equivalents of an organic ammonium ion of the formula

wherein R is an organic hydrocarbon radical containing at least 5 and not more than 9 carbon atoms and X, Y, and Z are members of the class consisting of hydrogen atoms and organic hydrocarbon radicals containing not more than 9 carbon atoms, the stoichiometric excess of said ammonium ion over the exchanged inorganic cation being bound to an organic anion wherein the organic radical is a hydrocarbon radical containing 10 to 30 carbon atoms, said cation-modified clay having the property of swelling in nonpolar organic liquids to at least 10 times its dry volume, thereby forming a stable gel.

3. A cation-modified organophilic bentonite, originally having a base-exchange capacity of 60–100, in which the exchangeable inorganic cation has been exchanged for at least 2 stoichiometric equivalents of an organic ammonium ion wherein one of the substituents on the nitrogen atom is a hydrocarbon radical which contains at least 5 and not more than 9 carbon atoms and the other substituents are hydrocarbon radicals which contain not more than 9 carbon atoms, the excess of said organic ammonium ion over the exchanged inorganic cation being bound to an organic anion wherein the organic radical is a hydrocarbon radical containing at least 10 and not more than 30 carbon atoms, said cation-modified bentonite having the property of swelling in nonpolar organic solvents to at least 10 times its dry volume, thereby forming a stable gel.

4. A cation-modified bentonite, originally exhibiting a base-exchange capacity of at least 60, in which the exchangeable inorganic cation has been exchanged for 2 to 3.5 stoichiometric equivalents of an organic ammonium ion wherein one of the substituents on the nitrogen atom is a hydrocarbon radical which contains at least 5 and not more than 9 carbon atoms and the other substituents are hydrocarbon radicals which contain not more than 9 carbon atoms, the excess of said ammonium ion being bound to 1 to 2.5 stoichiometric equivalents of an organic anion wherein the organic radical is a hydrocarbon radical containing at least 10 and not more than 30 carbon atoms, said cation-modified bentonite having the property of swelling in nonpolar organic solvents to at least 10 times its dry volume thereby forming a stable gel.

5. A cation-modified organophilic bentonite, originally having a base-capacity of 60–100, in which the exchangeable inorganic cation has been exchanged for 2 to 3.5 stoichiometric equivalents of an alkylammonium ion wherein the alkyl radical contains at least 5 and not more than 9 carbon atoms, the excess of said alkylammonium ion being neutralized by 1 to 2.5 stoichiometric equivalents of a fatty acid anion containing 10 to 30 carbon atoms, said cation-modified bentonite having the property of swelling in nonpolar organic solvents to at least 10 times its dry volume, thereby forming a stable gel.

6. A cation-modified bentonite, originally having a base-exchange capacity of 60–100, in which the exchangeable inorganic cation has been exchanged for at least 2 stoichiometric equivalents of octylammonium ion, the stoichiometric excess of octylammonium ion being neutralized by the stoichiometric equivalent of stearate ion, said cation-modified bentonite having the property of swelling in nonpolar organic solvents to at least 10 times its dry volume, thereby forming a stable gel.

7. A cation-modified bentonite, orginally exhibiting a base-exchange capacity of 60–100, in which the exchangeable inorganic cation has been exchanged for 3 stoichiometric equivalents of octylammoniun ion, the excess of octylammonium ion being neutralized by the stoichiometric equivalent of palmitate ion, said cation-modified bentonite having the property of swelling in toluene to at least 20 times its dry volume, thereby forming a stable gel.

8. The method of producing a cation-modified organophilic clay as defined in claim 1, which comprises co-precipitating from water with at least 2 stoichiometric equivalents of an organic ammonium compound wherein one substituent on the nitrogen atom is a hydrocarbon radical which contains 5 to 9 carbon atoms and the other substituents are hydrocarbon radicals which contain not more than 9 carbon atoms, a cation-exchanging swelling clay and water-soluble organic anionic agent wherein the organic radical is a hydrocarbon radical containing 10 to 30 carbon atoms, the quantity of said water-soluble organic anionic agent being stoichiometrically equivalent to the excess of organic ammonium compound over exchanged inorganic cation, and mechanically separating the precipitate of cationic-modified organophilic clay from the liquid phase.

9. The method of producing a cation-modified organophilic clay as defined in claim 1, which comprises suspending in water a cation-exchanging clay, adding thereto at least 2 stoichiometric equivalents of an organic ammonium compound wherein the organic radicals are hydrocarbon radicals which contain not more than 9 carbon atoms and at least one hydrocarbon radical contains 5 carbon atoms, then adding thereto a soluble salt of an organic anion wherein the organic radical is a hydrocarbon radical containing 10 to 30 carbon atoms to combine with the excess of ammonium ion over exchanged cation of the original clay, the quantity of said soluble salt of an organic anion being stoichiometrically equivalent to the excess of organic ammonium compound over exchanged inorganic cation, and physically separating the cation-modified organophilic clay from the aqueous phase.

References Cited in the file of this patent

UNITED STATES PATENTS

| | | |
|---|---|---|
| 2,033,856 | Smith | Mar. 10, 1936 |
| 2,531,427 | Hauser | Nov. 28, 1950 |
| 2,767,177 | Erickson | Oct. 16, 1956 |

OTHER REFERENCES

Hauser et al.: "J. A. C. S.," vol. 62 (1940), pp. 1811 to 1814 relied on.